(12) United States Patent
Christensen et al.

(10) Patent No.: US 11,703,139 B2
(45) Date of Patent: Jul. 18, 2023

(54) DUAL POPPET PRESSURE RELIEF VALVE WITH VACUUM ADAPTOR CAPABILITY

(71) Applicant: PREVCO Subsea LLC, Fountain Hills, AZ (US)

(72) Inventors: Don Christensen, Phoenix, AZ (US); John Head, Fountain Hills, AZ (US)

(73) Assignee: PREVCO Subsea LLC, Fountain Hills, AZ (US)

( * ) Notice: Subject to any disclaimer, the term of this patent is extended or adjusted under 35 U.S.C. 154(b) by 0 days.

(21) Appl. No.: 17/900,204

(22) Filed: Aug. 31, 2022

(65) Prior Publication Data

US 2022/0412476 A1 Dec. 29, 2022

Related U.S. Application Data

(63) Continuation of application No. 16/744,133, filed on Jan. 15, 2020, now Pat. No. 11,473,685.

(60) Provisional application No. 62/792,739, filed on Jan. 15, 2019.

(51) Int. Cl.
| | |
|---|---|
| *F16K 17/04* | (2006.01) |
| *F16K 17/06* | (2006.01) |
| *F16K 17/10* | (2006.01) |
| *F16K 15/06* | (2006.01) |

(52) U.S. Cl.
CPC .......... *F16K 17/044* (2013.01); *F16K 15/066* (2013.01); *F16K 17/06* (2013.01); *F16K 17/10* (2013.01); *Y10T 137/7743* (2015.04); *Y10T 137/7838* (2015.04); *Y10T 137/7846* (2015.04)

(58) Field of Classification Search
CPC ........ F16K 17/044; F16K 17/06; F16K 17/10; F16K 15/066; Y10T 137/7743; Y10T 137/7838; Y10T 137/7846
See application file for complete search history.

(56) References Cited

U.S. PATENT DOCUMENTS

| | | | | |
|---|---|---|---|---|
| 53,396 | A * | 3/1866 | Birkinbine | F04B 39/1033 137/533.27 |
| 54,768 | A * | 5/1866 | Pollock | F16K 15/063 137/512.3 |
| 72,363 | A * | 12/1867 | Cameron | F04B 39/1033 137/512 |
| 156,769 | A * | 11/1874 | Cameron | F04B 39/1033 137/906 |
| 160,869 | A * | 3/1875 | Bowers | F16K 47/00 137/516.25 |
| 173,521 | A * | 2/1876 | Warner | F16K 15/042 137/512 |

(Continued)

FOREIGN PATENT DOCUMENTS

GB 731863 A 6/1955

*Primary Examiner* — Daphne M Barry
*Assistant Examiner* — Frederick D Soski
(74) *Attorney, Agent, or Firm* — Allen, Dyer, Doppelt, + Gilchrist, P.A.

(57) ABSTRACT

A pressure relief valve is disclosed with a first stage valve that is in series with a second stage valve, with an enclosed cavity between the first stage valve and the second stage valve. The first stage valve relieves pressure from an enclosure into the enclosed cavity between the stages, when the pressure is above a cracking pressure of the first stage valve. The second stage relieves pressure from the enclosed cavity when the pressure is above the cracking pressure of the second stage valve.

22 Claims, 7 Drawing Sheets

(56) References Cited

U.S. PATENT DOCUMENTS

| | | | | |
|---|---|---|---|---|
| 570,727 A * | 11/1896 | Gale | ...................... | G05D 7/03 251/35 |
| 591,015 A * | 10/1897 | Schreidt | ............... | F16K 15/063 137/540 |
| 709,273 A * | 9/1902 | MacDonald | ............ | F16K 19/00 137/868 |
| 765,638 A * | 7/1904 | Schramm | ............... | B60T 15/043 303/54 |
| 782,162 A * | 2/1905 | McCarl | ................... | F23N 1/087 236/25 R |
| 965,052 A * | 7/1910 | Wainwright | ........ | F16K 17/0433 137/454.2 |
| 1,087,108 A * | 2/1914 | Cummings et al. | .... | F23N 1/087 137/594 |
| 1,170,050 A * | 2/1916 | Daniels | ................... | F16K 15/03 137/512.5 |
| 1,262,641 A * | 4/1918 | Cockburn et al. | .... | F16K 17/082 137/474 |
| 1,367,361 A * | 2/1921 | Drake | ..................... | H01T 13/14 313/142 |
| 1,493,149 A * | 5/1924 | Crandall | ................ | F16K 15/06 137/533.21 |
| 1,699,095 A * | 1/1929 | Clark | ...................... | F16K 15/03 137/613 |
| 1,799,266 A * | 4/1931 | Wallace | ............. | G05D 23/1313 137/506 |
| 1,862,311 A * | 6/1932 | Kling | ....................... | B67D 7/36 222/318 |
| 1,878,356 A * | 9/1932 | Wilcox | .................... | F01M 1/24 123/196 S |
| 1,939,844 A * | 12/1933 | Down | ..................... | B60T 15/304 303/33 |
| 1,977,806 A * | 10/1934 | Richardson | ............. | F16K 27/00 137/512 |
| 2,101,316 A * | 12/1937 | Kettnich | ............... | F24D 19/081 137/198 |
| 2,148,253 A * | 2/1939 | Barge | ........................ | G01F 7/00 73/197 |
| 2,178,901 A * | 11/1939 | Webster | ................... | F16K 17/04 73/1.72 |
| 2,192,592 A * | 3/1940 | Howard | ................... | G01F 11/28 137/207.5 |
| 2,202,211 A * | 5/1940 | Kling | .................... | F16K 15/066 137/513 |
| 2,361,866 A * | 10/1944 | Norway | .................. | F16K 1/307 251/149.4 |
| 2,371,720 A * | 3/1945 | Stine | ................... | A47L 15/4436 137/99 |
| 2,449,392 A * | 9/1948 | Kremiller | ............... | F16K 51/00 137/563 |
| 2,470,471 A * | 5/1949 | Carleton | ............... | F16K 15/063 137/99 |
| 2,590,408 A * | 3/1952 | Henneman | ............. | F16K 1/303 137/557 |
| 2,630,294 A * | 3/1953 | Ericson | ................... | F16K 5/225 137/512 |
| 2,643,090 A * | 6/1953 | Cluphf | .................... | E21B 34/06 137/329.01 |
| 2,713,874 A * | 7/1955 | Sundstrom | .............. | F16K 1/303 137/513.3 |
| 2,744,469 A * | 5/1956 | Schaefer | ................. | F16K 24/04 417/435 |
| 2,784,561 A * | 3/1957 | Postlewait | ............. | F16K 21/18 137/538 |
| 2,888,876 A * | 6/1959 | Nichols | ................ | F02M 59/462 417/490 |
| 3,542,063 A * | 11/1970 | Etter | ...................... | F16K 17/065 137/329.06 |
| 3,974,848 A | 8/1976 | Wheatley | | |
| 4,485,843 A | 12/1984 | Wolff | | |
| 4,889,154 A | 12/1989 | Rosenberg | | |
| 5,012,834 A | 5/1991 | Taylor | | |
| 5,465,752 A | 11/1995 | Higgins | | |
| 5,676,172 A | 10/1997 | Mukumoto | | |
| 6,179,052 B1 | 1/2001 | Purkis et al. | | |
| 6,659,184 B1 | 12/2003 | Tips et al. | | |
| 6,668,853 B2 | 12/2003 | Dean | | |
| 7,178,552 B2 * | 2/2007 | Takeda | .................. | F16K 15/063 137/516.27 |
| 7,434,593 B2 | 10/2008 | Noll et al. | | |
| 8,136,546 B2 * | 3/2012 | Griffiths | .................. | F16K 17/04 251/366 |
| 8,353,311 B2 * | 1/2013 | Rigamonti | ............. | F16K 17/30 137/512.1 |
| 8,622,082 B1 | 1/2014 | Roys | | |
| 9,354,638 B2 * | 5/2016 | Rebreanu | .................. | F16K 1/12 |
| 10,208,866 B2 | 2/2019 | Fisher | | |
| 11,473,685 B2 | 10/2022 | Christensen et al. | | |
| 2003/0205271 A1 | 11/2003 | Lee | | |
| 2006/0213556 A1 | 9/2006 | Royse | | |
| 2008/0000310 A1 | 1/2008 | Ide et al. | | |
| 2009/0178715 A1 | 7/2009 | Griffiths et al. | | |
| 2009/0250928 A1 * | 10/2009 | Rigamonti | ............. | F16K 17/30 285/339 |
| 2014/0360590 A1 * | 12/2014 | Bertoldi | ................ | F16K 17/048 137/15.18 |
| 2015/0276072 A1 * | 10/2015 | Rebreanu | .................. | F16K 1/00 137/512.5 |
| 2016/0084390 A1 | 3/2016 | He et al. | | |
| 2016/0259349 A1 * | 9/2016 | Rebreanu | ........... | G05D 16/0666 |

* cited by examiner

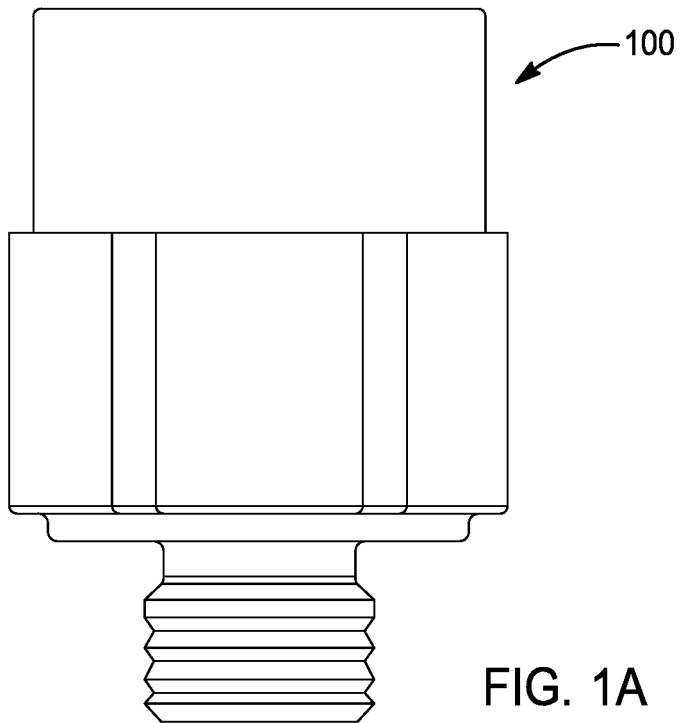
FIG. 1A
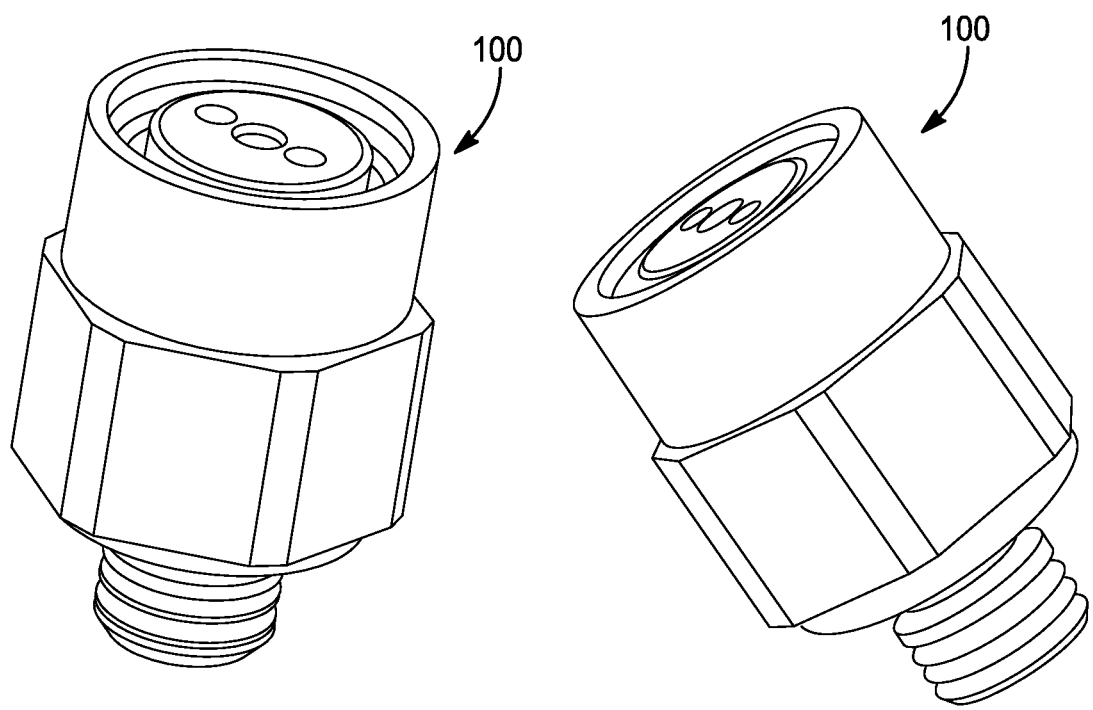
FIG. 1B
FIG. 1C

DUAL POPPET PRESSURE RELIEF VALVE WITH VACUUM ADAPTOR CAPABILITY

CROSS-REFERENCE TO RELATED APPLICATIONS

This application is a continuation of U.S. patent application Ser. No. 16/744,133, which claims the benefit under 35 USC 119(e) of U.S. Provisional Patent Application No. 62/792,739, filed Jan. 15, 2019, the entire disclosures of all of which are hereby incorporated by reference in their entirety.

TECHNICAL FIELD

This disclosure relates to a dual poppet pressure relief valve with vacuum adaptor capability.

BACKGROUND

For various reasons, a pressure differential may be formed between an internal pressure inside of a sealed enclosure and an external pressure outside of the enclosure (such as a subsea housing). A Pressure Relief Valve (PRV) can be used on the sealed enclosure to prevent the internal pressure from becoming significantly higher than the external pressure. For safety reasons, the internal pressure should not become significantly higher than the external pressure.

For example, in the subsea industry pressure relief valves with relatively low cracking pressures are often used as a safety device to prevent the buildup of inside pressure within a subsea electronics housing. Subsea housings are hydrostatic pressure vessels designed for external pressure and are typically not capable of withstanding even modest relative internal pressure without failure. Significant internal pressures can develop as the result of hydraulic leaks, battery off-gassing and or slow sea water leaks that cannot relieve internal pressure quickly enough during recovery to the surface.

Unfortunately pressure relief valves have a reputation for poor reliability in the subsea environment. Corrosion and fouling of the moving parts by suspended particulate matter can sometimes lead to failure by preventing the valve from reseating sufficiently to establish a reliable seal. While the use of redundant corrosion resistant materials and seals improve reliability of subsea pressure relief valves these enhancements do not address the fundamental problem of the mechanical parts within the valve; each being single point of failure.

In prior implementations, a PRV can include a valve body, a poppet that seals on the valve body, a spring that encourages the poppet to stay in contact with the valve body to maintain a seal, and a nut the holds the spring in place. The seal of the PRV on the poppet may permit egress of the internal pressure without allowing the ingress of external environment (such as seawater), as this could destroy valuable equipment residing internal to the sealed enclosure. However, even a single piece of debris may become lodged within a sealing area of prior PRVs, leading to potentially catastrophic single point failure.

There is often need to be able to evacuate the sealed enclosure and/or backfill the sealed enclosure with a gas or liquid, and do to allow venting, evacuation, and/or backfill to occur with higher reliability and without risk of single point failure.

SUMMARY

This section provides a general summary of the present disclosure and is not a comprehensive disclosure of its full scope or all of its features, aspects, and objectives. For purposes of this application, certain terms may be considered interchangeable; for example, the terms "internal poppet," "first stage valve," "first poppet," and "first poppet valve" may be used interchangeably, and the terms, "external poppet," "second stage valve," "second poppet," and "second poppet valve" may be used interchangeably.

The embodiments of the pressure relief valves disclosed relate to pressure relief valves for relieving pressure inside a chamber, including a chamber used in the deep sea or other high pressure environments with improved reliability over existing pressure relief valve designs. In an example embodiment, the relief valve includes a first stage with a first valve having a first cracking pressure value, and a second stage with a second valve, having a second cracking pressure value. An enclosed cavity is between the first stage and the second stage, so that the first valve relieves pressure above the first cracking pressure value from an enclosed housing into the enclosed cavity, and the second stage valve relieves pressure above the second cracking pressure value from the enclosed cavity into an outside environment. In one exemplary embodiment, the second cracking pressure value is approximately 3-4 psi greater than the first cracking pressure value, but may comprise any desired range.

The first valve may include a first body or first housing and a first poppet, and the second valve may include a second body or second housing and a second poppet. The first body may have an opening configured to receive the second body, with the second body occupying at least a portion of the opening. At least one seal may be placed between the first body and the second body. The enclosed cavity may be formed with a sealed space between the first body and second body.

The second valve may also include a threaded stem and a second stage spring configured to bias the second valve into a closed position until a sufficient opening force is applied to the valve or sufficient internal pressure builds within the cavity. An adjustment nut may be used to adjust a load on the first stage spring and a second stage spring (or both), and may allow selective bias between closing forces applied to the first poppet and second poppet. In various embodiments, the adjustment nut is positioned on the threaded stem of the second poppet to set the cracking pressure values as desired.

The adjustment nut may be set so that the first cracking pressure value is higher than the second cracking pressure value. Alternatively, the first cracking pressure value may be approximately the same as the second cracking pressure value. In another embodiment, the first adjustment nut may be set so that the first cracking pressure value is lower than the second cracking pressure value.

The first adjustment nut may be set so the first cracking pressure is approximately within a first range. The range may be any desired values to allow mechanical progression between opening of the first poppet and the second poppet, for example 3-4 psi, 5-7 psi, or 5-10 psi. The second poppet valve may include a second spring configured to keep the second poppet valve in a closed position until the valve is actuated from an exterior tool or from internal pressure buildup within the cavity.

A cap may be placed next to the second valve to prevent particles from entering the second valve. The cap may be attached to the second body in a manner so that the cap will be removed if a high rate of fluid passes through the second valve.

A high flow indicator may be attached to the second stage. The high flow indicator may be configured to indicate when a high flow of fluid has passed through the second valve.

The first poppet valve may include a bottom sealing surface, a vertical bore, and a horizontal bore passing through the vertical bore configured to accept a locking pin. A first valve spring disposed around a vertical flange of the first poppet valve may apply a bias to the first poppet to remain in a closed position until sufficient forces are applied to the second poppet to apply lifting forces to the locking pin disposed within the horizontal bore. The first valve spring may be configured to entrap the pin within the horizontal bore once the spring is installed over the flange.

In another example embodiment, an enclosed housing may have an exterior and an interior, where the enclosed housing is configured to protect the interior from pressurized fluids on the exterior of the enclosed housing. The enclosed housing may also include a pressure relief port that allows fluid to pass from the interior of the enclosed housing to the exterior of the enclosed housing. The enclosed housing may include a pressure relief valve having a total cracking pressure value. The pressure relief valve may be fixed in the pressure relief port that is configured to allow fluid to pass in one direction from the interior of the enclosed housing to the exterior of the enclosed housing when fluid pressure on the interior of the enclosed housing is greater than the sum of fluid pressure on the exterior of the housing and the total cracking pressure value. The pressure relief valve may include a first stage valve, and a second stage valve, and an enclosed cavity between the first stage valve and the second stage valve.

The first stage valve may have a first cracking pressure value, and the second stage valve may have a second cracking pressure value that is lower than the first cracking pressure value. The first stage valve may be configured to allow fluid to pass in one direction from the interior of the housing into the enclosed cavity. The second stage valve may be configured to allow fluid to pass in one direction from the enclosed cavity to the exterior of the housing. The enclosed housing may be configured to withstand fluid pressure, with a maximum fluid pressure up to the design operating pressure.

An example method of producing a high reliability pressure relief valve may include the steps of: assembling a first stage with a first pressure relief valve for relieving fluid pressure from an enclosed housing above a first cracking pressure value; assembling a second stage with a second pressure relief valve to relieve pressure above a second cracking pressure value; and assembling the first stage with the second stage in series, with an enclosed cavity between the first stage and the second stage, where the first stage relieves pressure above the first cracking pressure value from the enclosed housing into the enclosed cavity, and where the second stage relieves pressure above the second cracking pressure value from the enclosed cavity into an outside environment outside the enclosed housing. The first cracking pressure value may be a higher pressure than the second cracking pressure value. The example method may include the steps of: adjusting the first stage to set the first cracking pressure value; and adjusting the second stage to set the second cracking pressure value. The example method may further include disposing a valve adjustment nut on a threaded portion of the second poppet valve to accept a first spring and second spring, the first spring applying bias-closed force to the first poppet valve, and the second spring applying bias-closed force to the second poppet valve. The example method may also include adjusting the nut to apply selected first and second cracking force ranges respectively to the first and second poppet valves.

As will be made clear, the disclosed embodiments of the pressure relief valve provide important advantages in providing a highly reliable pressure relief system for enclosed housings in a high pressure environment. Disclosed herein are implementations of a pressure relief valve (PRV) comprising a first poppet and a second poppet. The first poppet and the second poppet can be packaged as one unit and work in series.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 1A is a plan view of a dual poppet PRV assembly in accordance with aspects of the present disclosure.

FIGS. 1B and 1C are a perspective views of a dual poppet PRV assembly in accordance with aspects of the present disclosure.

Identical reference numerals between figures indicates like or similar components.

DETAILED DESCRIPTION

The following description is merely exemplary in nature and is not intended to limit the disclosure in its application or uses. For purposes of clarity, the same reference numbers are used in the description and drawings to identify similar elements.

To improve reliability of the seal of the PRV on the poppet in permitting egress of the internal pressure without allowing the ingress of external media (such as seawater), two independently operating PRVs arranged in series, can be placed in a single valve body. Thereby, if one PRV fails the other will protect the equipment internal to the enclosure, such as a sealed enclosure.

A secondary use of the PRV can be as a conduit to pull a vacuum inside the enclosure (such as a subsea housing in preparation to deploy). The vacuum can provide confirmation that all seals are functioning.

A third use of the PRV can be used as a conduit to allow back-fill with a gas or liquid. On a single poppet PRV, an adaptor can manually lift the poppet and expose a flow path for these procedures.

A fourth use of the PRV can be used as a scuttle valve that is to force the valve open mechanically to allow the external media to flood the internals of the enclosure. This may be used in subsea applications to allow seawater inside the enclosure, which could render the internal equipment unusable.

FIGS. 1A-1C illustrate external views of a dual PRV assembly. A dual PRV may be referred to as a dual poppet relief valve or a dual poppet PRV. The dual PRV can include two poppets in series, including a first poppet (or internal poppet) and a second poppet (or external poppet). The poppets as referred to in this disclosure can be any devices that can open and close flow of a valve seat. The poppets can be formed into any desired shape. The poppets can be formed from any desired material, for example steel, aluminum, or in preferred embodiments, titanium.

Figure 2A:
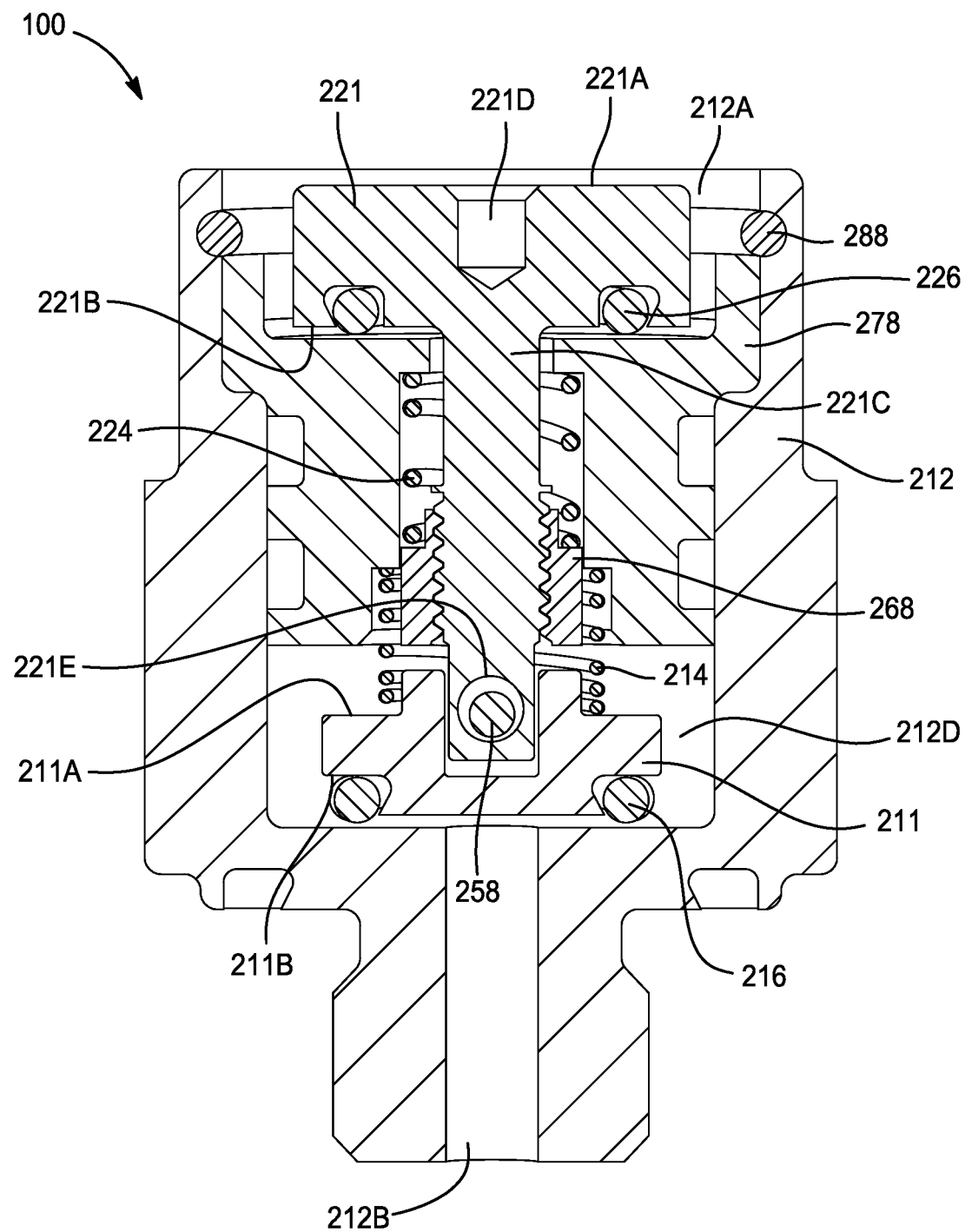
FIG. 2A is a cross sectional view of the dual poppet assembly of FIG. 1A in accordance with aspects of the present disclosure.
Figure 2B:
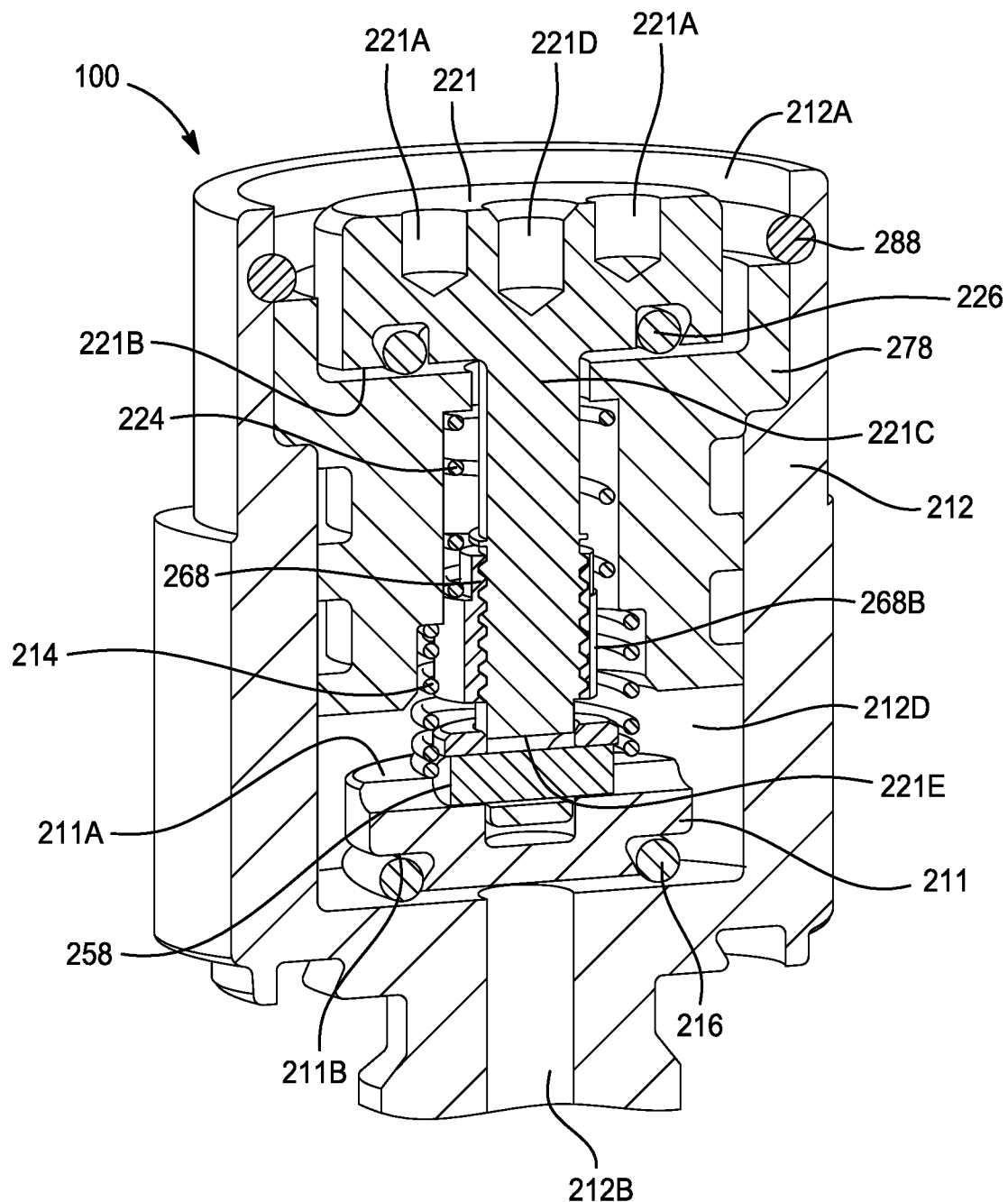
FIG. 2B is another cross sectional view of the tooling for the dual poppet assembly of FIG. 1A in accordance with aspects of the present disclosure, axially rotated approximately 90 degrees from FIG. 2A.
Figure 2C:
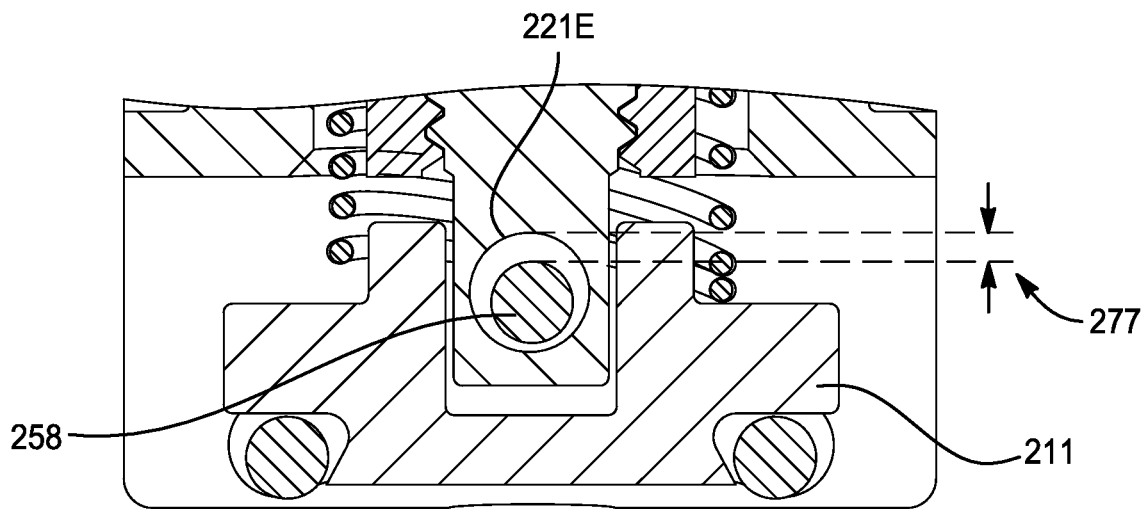
FIG. 2C is an enlarged view of a portion of FIG. 2A, showing a gap disposed between a locking pin and an internal bore of the second stage valve.
Figure 8:
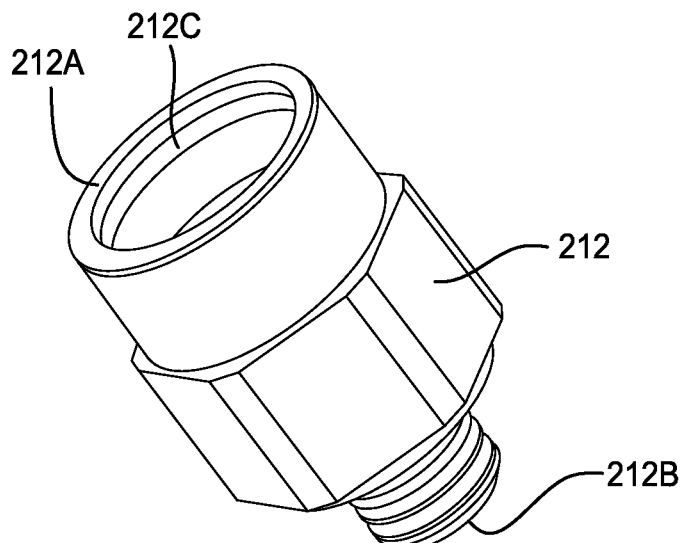
FIG. 8 is a top perspective view of a first valve housing/body of the present invention.
Figure 9:
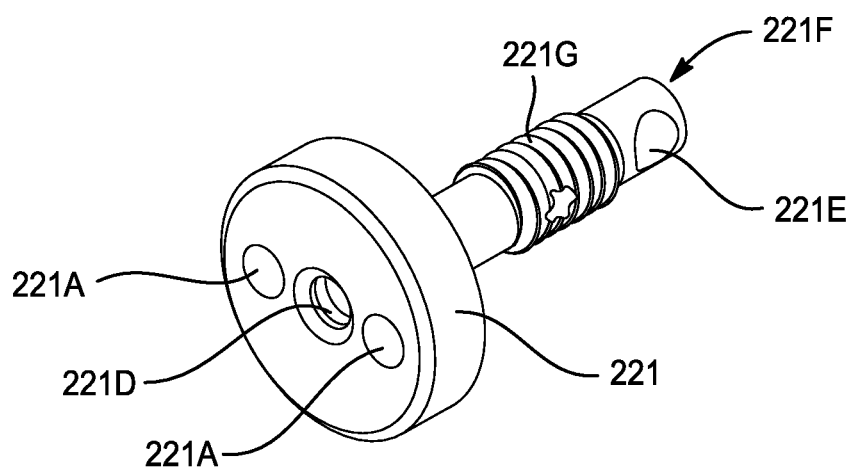
FIG. 9 is a perspective view of a second poppet valve of the present invention.

FIGS. 2A and 2B show, in cross section, an example arrangement of a dual PRV of the present invention. A first stage valve 211 is disposed near an orifice 212B, in the first housing or first body 212. The first stage valve 211 sealably engages a bottom surface of the first housing 212, and with first seal 216, blocks free fluid communication from an interior area through orifice 2123. First stage valve 211 is mechanically coupled to the second stage valve 221 through a pin 258 disposed within bore 221E of the second stage valve, and the horizontal bore 211D of the first stage valve. First stage spring 214 is coupled between a flange of first stage valve 211 and the adjustment nut 268, and biases the first stage valve into a closed position. Second stage spring 224 is coupled between the adjustment nut 268 and the second housing 278, and biases the second stage valve into a closed position. Adjustment of the nut 268 allows differential forces to be applied between the first date valve a second stage valve, thus allowing cracking forces to be selected for each valve. The adjustment nut 268 is shown disposed on a threaded portion 221G of the shaft 221C of the second stage valve 221, and additional detail of the second stage valve may be seen as shown in FIG. 9. A second valve seal, 226 is disposed within a bottom cavity of the second stage valve 221 and provide sealing between a bottom surface 221B second stage valve 221 and the second body 278. A bore 221E is horizontally disposed in a distal end 221F the second stage valve 221, and is disposed to accept a locking pin 258, so that external pulling forces applied to the second stage valve may be coupled through the locking pin 258 to the first stage valve 211. As shown in FIG. 2C, dimensions of the bore 221E and the locking pin 258 are selected to create a desired a gap 277. The dual poppet PRV can include a retainer formed of nylon, or other desired material, positioned in an upper portion (e.g., FIG. 8, 212C) of the dual poppet PRV. All parts in the foregoing example which are exposed to sea water may be Titanium, coated to reduce galvanic corrosion.

On a dual PRV, the external poppet may be physically accessible to lift and the second poppet may prevent the vacuum operation. Because the valves should operate independently to be viable as double protection, it may not be feasible to make a fixed connection between the two poppets.

Issues may arise when the two poppets to operate independently during operation. For example, both poppets may not lift during the vacuum operation. Embodiments of the present disclosure provides a solution by creating a coupling between the two poppets (achieved, as described above in regards to FIGS. 2A-2C by the locking pin 258 disposed within bores 221E of the second poppet and bore 211D of the first poppet) that can have more clearance than required during relief operation, thus allowing the poppets to work independently. However, the clearance (FIG. 2C, 277) in the coupling can be small enough to be closed when manually lifting the external poppet, thereby also lifting the internal poppet; this can complete the conduit and allow for the vacuum/backfilling process.

Further embodiments also provide that, the coupling between the two poppets may not be restricted during operation. Rather, the coupling can be manually moved enough to influence the internal poppet with the external poppet. The coupling can be configured to allow for calibration of each PRV and then connect them in a simple, reliable way. The external poppet can attach to an external device to mechanically lift the external poppet, which in turn can also lift the internal poppet.

Figure 5:
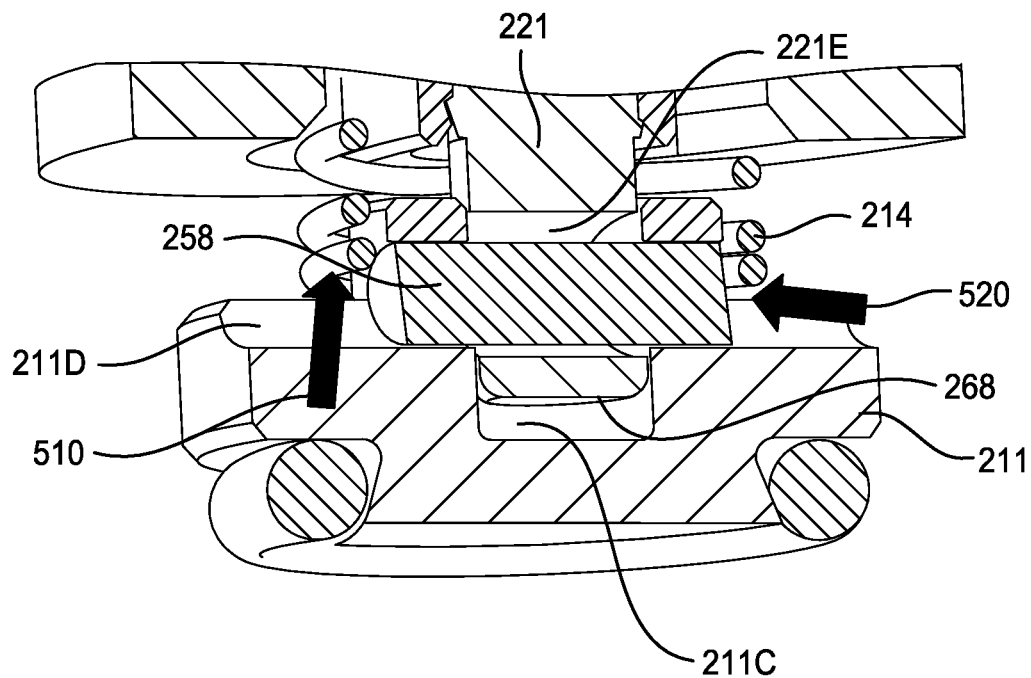
FIG. 5 is a cross sectional view of a portion the dual poppet PRV in accordance with aspects of the present disclosure, illustrating installation and entrapment of a locking pin.

As illustrated in FIGS. 2A-C, an end of the external poppet 221 can be extended in a shaft-like fashion (e.g. threaded stem 221C). This shaft can slide into a bore 211C on the internal poppet 211, allowing independent movement of both the internal poppet and the external poppet. The sliding can be performed in a concentric fashion or any other desirable way. Both an external poppet shaft and an internal poppet bore can receive a cross-bore hole. As shown in FIG. 5, the coupling can be formed by sliding a locking pin 258 through the cross-bore that limits the (relative) axial movement between the two poppets. Because independent axial movement may be required for operation, the pin 258 and bores 221E/211D can be configured for sufficient clearance. The clearance may be configured to include a large enough manual movement (lifting) of the external poppet to close the gap and begin lifting the internal poppet 211. The pin 258 can be relatively loose to allow for independent poppet operation. The pin can also be trapped from falling out by an internal PRV spring. The locking pin 258 can be formed of nylon, PRV thread lock material, or any other desired material. The pin 258 can be positioned in a lower portion of the dual poppet PRY PRV. Also as shown in FIG. 5, the locking pin 258 can be inserted into the bore 211D/221E by lifting the first stage spring 214 and sliding the pin 258 into the desired position or any other desired insertion method. After the pin 258 is positioned, the spring 214 can be released. When the spring is released, the pin may be entrapped by the spring 214 and remain in place.

In one exemplary embodiment, the pressure relief valve (PRV) includes a first poppet and a second poppet. The first poppet and the second poppet are packaged as one unit and work in series. The PRV can be configured to operate at extreme external pressures (such as in the deepest ocean at depths or other external pressure environments). For example, the external pressures in the ocean may include pressures at depths of 6,000 meters or greater.

The dual poppet PRV can include external features that interface with an adaptor and allow the PRV to be opened for evacuation and backfilling operations of the enclosure (e.g., a vacuum adaptor, a sealed enclosure). The dual poppet PRV can have an internal coupling between the two poppets that do not prevent independent operation of the poppets. The internal coupling between the two poppets can allow the internal poppet to be manually lifted by the external poppet. The internal coupling between the two poppets can use a sliding fit, or any other desired fit, that keeps the two poppets relatively concentric. The internal coupling between the two poppets can have a pin, such as a cross pin, or any other desired device, which limits the axial relative movement of the two poppets, allowing the external poppet to lift the internal poppet. The internal coupling between the two poppets can have the pin, such as the cross pin that does not inhibit the axial, relative movement, or any other desired movement, of the two poppets during operation. The internal coupling between the two poppets can have the pin, such as the cross pin, which is retained by the internal poppet spring.

Figure 3:
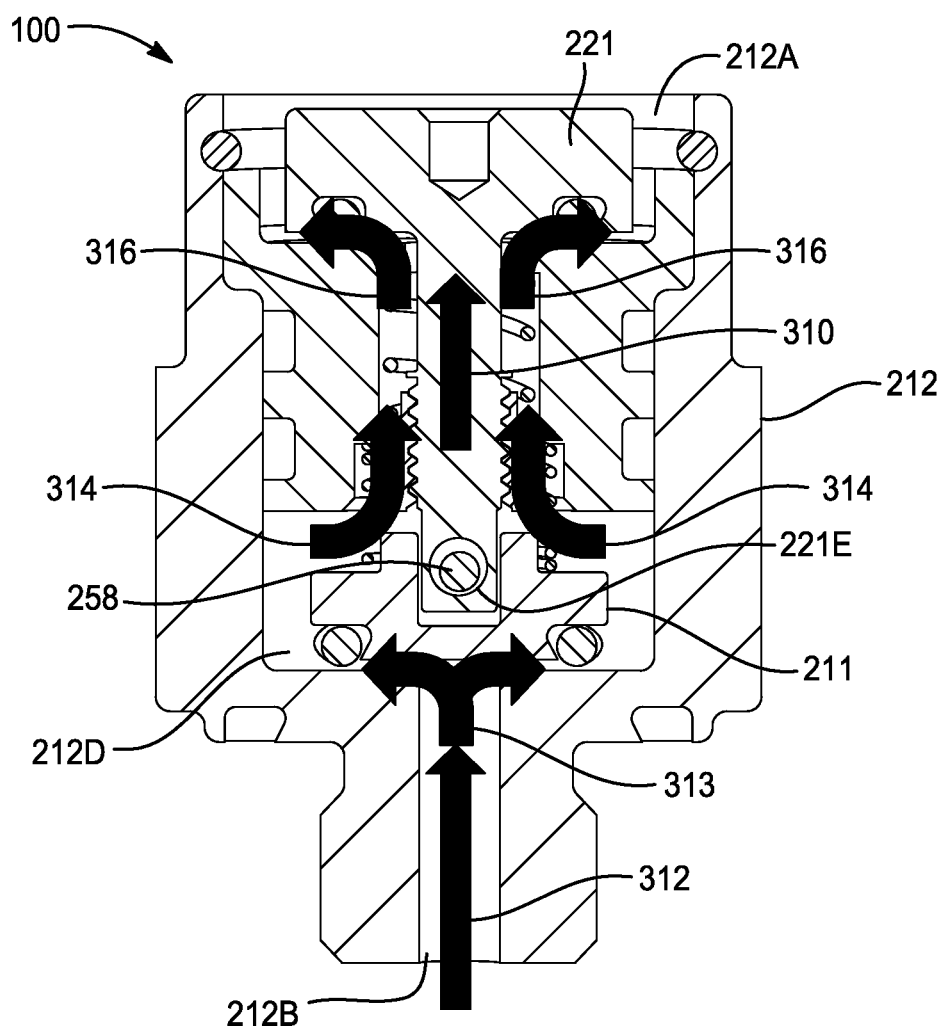
FIG. 3 is a cross sectional view of the dual poppet assembly functioning in accordance with aspects of the present disclosure.
Figure 4A:
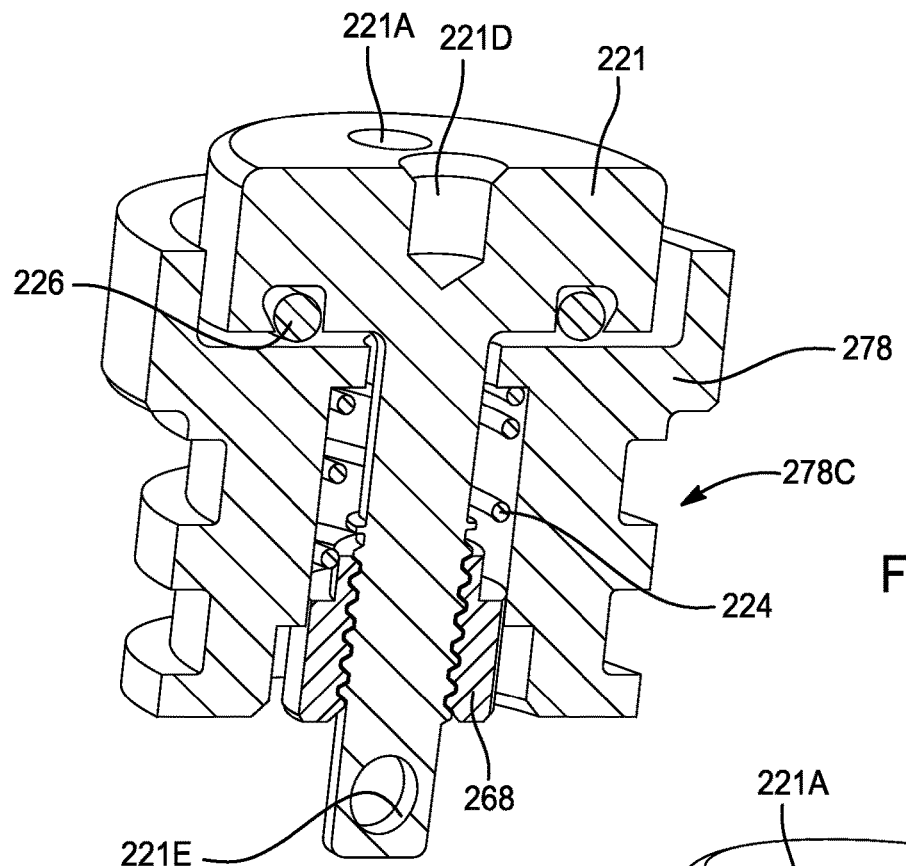
FIG. 4A is an external poppet assembly in accordance with aspects of the present disclosure showing a second poppet seated in a second stage body/housing.
Figure 4B:
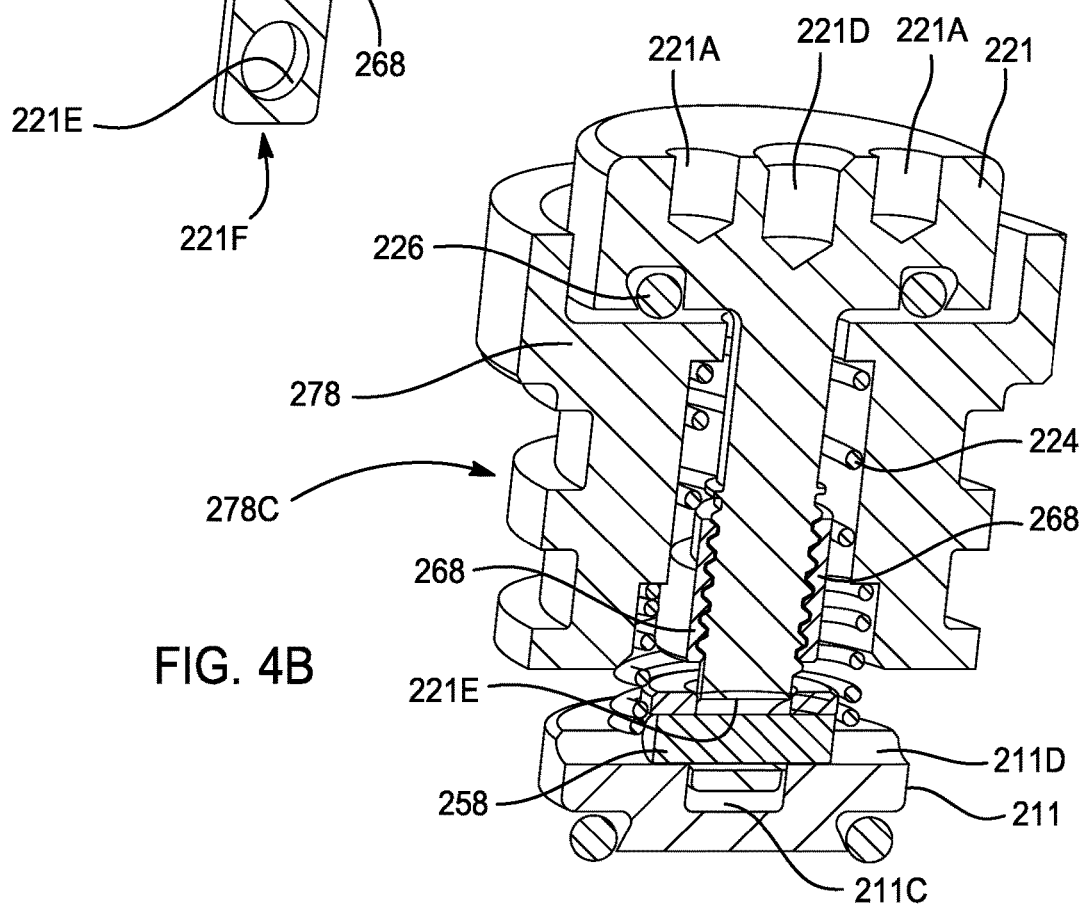
FIG. 4B is an internal and an external poppet in accordance with aspects of the present disclosure.
Figure 6:
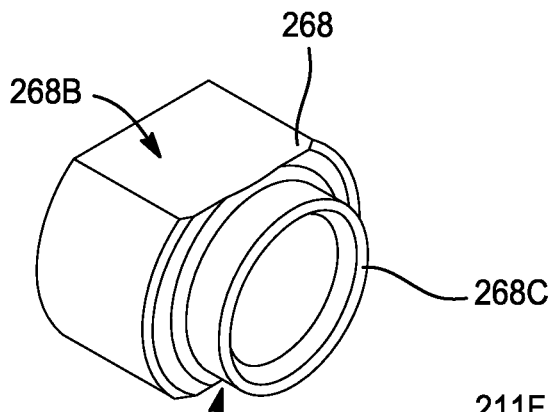
FIG. 6 is a perspective view of a valve adjustment nut of the present invention.
Figure 7:
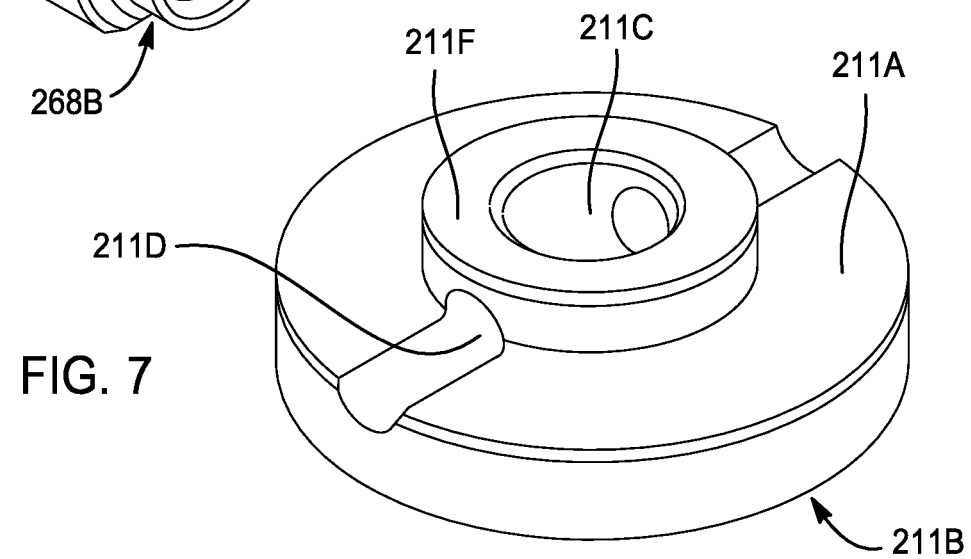
FIG. 7 is a top perspective view of a first poppet valve of the present invention.

The example configuration shown in FIGS. 2-4 shows an adjustment nut 268 for adjusting the cracking pressure of the first and second poppet valves. A perspective view of the nut 268 is shown on FIG. 6, and includes a flanged portion 268B to engage and retain the first stage spring 214, and flat surfaces 268B to allow the nut to be more easily turned on threaded shaft 221G (see also FIG. 9), and to allow fluid communication between an external area proximate the opening 212A and internal area proximate the opening 212B. The internal bore of the nut 268 is typically threaded to engage with threads 221G (FIG. 9) of the shaft 221C, although threads are not shown in FIG. 6 for simplicity. In other embodiments other means may be used to set a cracking pressure, which may be adjustable, or alternatively may be set without adjustment. Further, one or both of the valves may have an adjustment available for the cracking pressure.

FIG. 3 illustrates one mode of operation of the dual PRV of the present invention. In this mode, a force 310 is applied to the second poppet 212 to pull to poppet 212 toward the external opening 212A area. Such force may be applied through a tool traded into the bore 221D, adjacent bores 221A, as shown in FIG. 9. The second poppet 221 moves toward the external direction, coupling to the first poppet through installed locking pin 258. Once sufficient force is applied to bias the first and second poppets into an open position, fluid communication may occur from, for example, an internal area 312 passing through opening 212B, around 313 the now-open seal 216 of the first poppet 211, into the enclosed cavity 212D up 314 the enclosed cavity around the adjustment nut 268 (especially around flat portions 268B that allow fluid communication) and shaft 221C and through 316 the now-open area appearing between the seal 226 and the second housing surface 278A. Releasing the force 310 will allow both valves to translate to a closed position through the spring forces of springs 224, 214.

Figure 10:
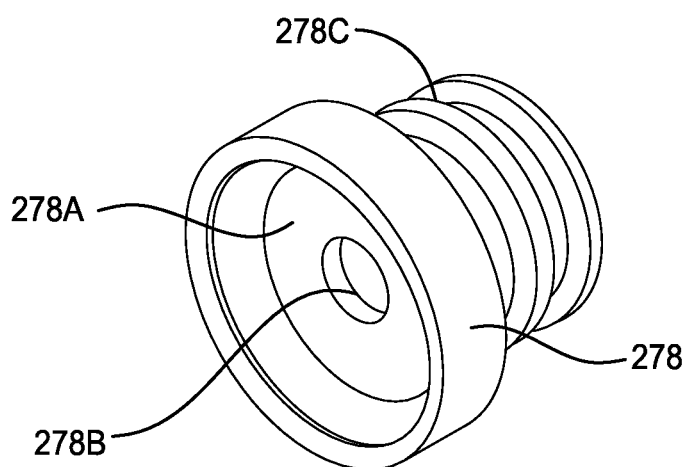
FIG. 10 is a perspective view of a second valve housing/body of the present invention.

FIG. 10 illustrates a perspective view of a second housing/body 278 of the present invention, where the second poppet 221 may be seated in area 278A, and stem 221C may pass through opening 278B to the cavity formed below once the part is installed. Grooves 278C are configured to provide mechanical coupling between the first housing 212 and the second housing 278, and the coupling is illustrated in FIGS. 2A-2B.

In the embodiments shown and discussed, particular configurations are shown by way of example, and other configurations and devices may be used within the disclosed novel inventive concepts. For example, the shape and configuration of the first body 212 and the second body 278 are shown by way of example. In alternative embodiments, the first body and the second body may be formed together rather than as two separate parts. Similarly, the type and configuration of the valve mechanisms may be any valve mechanism that allows a set cracking pressure and is capable of allowing fluid to flow in one direction, and withstand outside pressure. The drawings also show multiple redundant seals by way of example and not limitation. The invention may be practiced with any number of redundant seals sufficient to prevent fluid from passing from the exterior of the housing into the interior 212B of the housing 212.

In the example embodiments, springs are discussed and illustrated as coil springs, such as metal corrosion resistant material springs. Other springs may be used to provide force to keep the valve closed below the desired cracking pressure. A spring is any elastic object used to store mechanical energy.

The valve and housing discussed above may be used in a high pressure environment, such as in a deep sea environment. The fluid inside the housing may be air, or alternatively, it may be other fluids. The fluid outside the housing may be water, for example seawater, or it may be air or other fluids.

The example illustrated configurations shows an adjustment nut 268 for adjusting the cracking pressure of the valves. In other embodiments other means may be used to set a cracking pressure, which may be adjustable, or alternatively may be set without adjustment. Further, one or both of the valves may have an adjustment available for the cracking pressure.

The examples discussed above have described relieving pressure from inside a housing as an example application of the pressure relief valve. This is not by way of limitation as the pressure relief valve 100 may be used in any environment where fluids are to be controlled and allowed to flow in only one direction based on pressure differentials. The valve disclosed may allow fluid into a normally high pressure system when the pressure drops below a set value, such as in a water or gas supply system, and may be used for other applications other than those where pressure is relieved. In this manner an outside, external or exterior environment is describing the environment where fluid flows after the fluid passes through the second stage of the valve, and an inside, internal, or interior environment is describing the environment from which fluid will flow into the valve when the pressure differential allows the valve to open.

While the principles of the invention have been made clear in illustrative embodiments, there will be immediately obvious to those skilled in the art many modifications of structure, arrangement, proportions, and methods, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A pressure relief valve (PRV) assembly comprising:
a housing having an opening therein, an interior cavity, and a passageway extending between the opening and the interior cavity, the housing having a flange extending into the passageway adjacent the opening;
a first stage valve carried within the interior cavity;
a second stage valve coupled to and fluidly in series with said first stage valve, said second stage valve comprising
an enlarged head carried within the opening,
a threaded shaft extending from said enlarged head within the passageway, and
a nut threadably engaging said threaded shaft; and
a biasing member seated against said nut and said flange, said biasing member biasing the first and second stage valves to a closed position.

2. The PRV assembly of claim 1 wherein said housing has an orifice therein from the interior cavity to an exterior of the housing; and wherein said first stage valve comprises a first stage valve body and a seal carried by said first stage valve body for engaging the housing within the interior cavity and for restricting fluid communication between the interior cavity and the orifice.

3. The PRV assembly of claim 1 wherein said first stage valve comprises a first stage valve body having a first opening therein to receive said threaded shaft therein.

4. The PRV assembly of claim 3 further comprising a coupling member; wherein said threaded shaft has a shaft opening therein adjacent a distal end thereof; and wherein said first stage valve body has a second opening therein transverse to the first opening and aligned with the shaft opening for receiving said coupling member therethrough.

5. The PRV assembly of claim 1 further comprising a further biasing member between a shoulder of said housing and said first stage valve.

6. The PRV assembly of claim 5 wherein the further biasing member comprises a coil spring.

7. The PRV assembly of claim 5 wherein the further biasing member is positioned in a recess in the cavity and around said nut.

8. The PRV assembly of claim 1 wherein said housing comprises first and second nested housings.

9. The PRV assembly of claim 8 further comprising a housing seal between said first and second nested housings.

10. The PRV assembly of claim 1 wherein said biasing member comprises a coil spring.

11. The PRV assembly of claim 1 further comprising a coupling member coupling said first stage valve to said shaft.

12. The PRV assembly of claim 1 wherein said second stage valve comprises a seal carried by said enlarged head for restricting fluid communication between the opening and the passageway.

13. The PRV assembly of claim 1 wherein said biasing member is carried within the passageway between said nut and said flange.

14. The PRV assembly of claim 1 wherein said threaded shaft has a non-threaded portion adjacent said biasing member.

15. A pressure relief valve (PRV) assembly comprising:
a housing having an opening therein, an interior cavity, a passageway extending between the opening and the interior cavity, the housing having a flange extending into the passageway adjacent the opening, and an orifice extending between the interior cavity and an exterior of said housing;
a first stage valve carried within the interior cavity for engaging adjacent portions of said h use housing within the interior cavity to restrict fluid communication between the interior cavity and the orifice;
a second stage valve coupled to and fluidly in series with said first stage valve, said second stage valve comprising
an enlarged head carried within the opening for restricting fluid communication between the opening and the passageway,
a threaded shaft extending from the enlarged head within the cavity, and
a nut threadably engaging said threads;
a coupling member coupling said first stage valve to said shaft; and
a biasing member seated against said nut and said flange, said biasing member biasing the first and second stage valves to a closed position.

16. The PRV assembly of claim 15 wherein said first stage valve comprises a first stage valve body having a first opening therein for receiving said threaded shaft therein.

17. The PRV assembly of claim 5 further comprising a coupling member; wherein said threaded shaft has a shaft opening therein adjacent a distal end thereof; and wherein said first stage valve body has a second opening therein transverse to the first opening and aligned with the shaft opening to receive said coupling member therethrough.

18. The PRV assembly of claim 15 wherein said biasing member comprises a coil spring.

19. The PRV assembly of claim 15 further comprising a further biasing member between a shoulder of said housing and said first stage valve.

20. The PRV assembly of claim 15 wherein said first stage valve comprises a first stage valve body and a seal carried by said first stage valve body for engaging the housing within the interior cavity and for restricting the fluid communication between the interior cavity and the orifice.

21. A method of making a pressure relief valve (PRV) assembly comprising:
positioning a first stage valve within the interior cavity of a housing having an opening therein and a passageway extending between the opening and the interior cavity, the housing having a flange extending into the passageway adjacent the opening;
positioning a second stage valve fluidly in series with the first stage valve, within the opening, the second stage valve comprising an enlarged head within the opening, a threaded shaft extending from the enlarged head into the passageway, and a nut threadably engaging the threaded shaft; and
positioning a biasing member seated against the nut and the flange, the biasing member biasing the first and second stage valves to a closed position.

22. The method of claim 21 coupling a further biasing member between a shoulder of the housing and the first stage valve.

* * * * *

UNITED STATES PATENT AND TRADEMARK OFFICE
CERTIFICATE OF CORRECTION

| | |
|---|---|
| PATENT NO. | : 11,703,139 B2 |
| APPLICATION NO. | : 17/900204 |
| DATED | : July 18, 2023 |
| INVENTOR(S) | : Don Christensen and John Head |

It is certified that error appears in the above-identified patent and that said Letters Patent is hereby corrected as shown below:

In the Specification

Column 5, Line 35    Delete: "2123"
                     Insert: --212B--

Column 10, Line 6    Delete: "h use"

Column 10, Line 27   Delete: "claim 5"
                     Insert: --claim 16--

Signed and Sealed this
Third Day of October, 2023

Katherine Kelly Vidal
*Director of the United States Patent and Trademark Office*